United States Patent [19]

Gannis et al.

[11] Patent Number: 5,002,802

[45] Date of Patent: Mar. 26, 1991

[54] METHOD OF PRODUCING FLAVOR INFUSED PARTIALLY-DEFATTED NUTS AND PRODUCT

[75] Inventors: Peter Gannis, Stamford; Howard Wilkins, Brookfield, both of Conn.

[73] Assignee: Nabisco Brands, Inc., East Hanover, N.J.

[21] Appl. No.: 401,017

[22] Filed: Aug. 31, 1989

[51] Int. Cl.⁵ .............................................. A23L 1/36
[52] U.S. Cl. ...................................... 426/632; 426/93; 426/98; 426/99; 426/103; 426/302; 426/438
[58] Field of Search ................. 426/93, 98, 99, 103, 426/302, 307, 309, 438, 632

[56] References Cited

U.S. PATENT DOCUMENTS

| Re. 30,651 | 6/1981 | Green | 426/632 |
|---|---|---|---|
| 3,294,549 | 12/1966 | Vix et al. | 426/632 |
| 3,645,752 | 2/1972 | Baxley | 426/632 |
| 4,049,833 | 9/1977 | Gannis et al. | 426/93 |
| 4,206,246 | 6/1980 | Mamahit | 426/632 |
| 4,329,375 | 5/1982 | Holloway, Jr. et al. | 426/632 |
| 4,364,967 | 12/1982 | Black | 426/632 |
| 4,466,987 | 8/1984 | Wilkins et al. | 426/417 |
| 4,504,513 | 3/1985 | Black | 426/632 |
| 4,522,833 | 6/1985 | Sharma | 426/93 |

Primary Examiner—Marianne Cintins
Assistant Examiner—Helen Pratt

[57] ABSTRACT

The present invention relates to flavorful partially-defatted nuts and a process of preparing them by infusing partially-defatted nuts with an edible oil, preferably containing a flavoring agent and a sweetener. This process makes it possible to produce partially-defatted nuts having both an improved flavor and a low caloric content.

20 Claims, No Drawings

METHOD OF PRODUCING FLAVOR INFUSED PARTIALLY-DEFATTED NUTS AND PRODUCT

BACKGROUND OF THE INVENTION

The application of a flavoring agent to nuts has long been known in the art. For instance, U.S. Pat. No. 3,457,087 to Renner discloses a process for eliminating surface blemishes from peanuts by heating them to a temperature above the boiling point of water and then quenching in an oil bath which may contain various flavors and aroma-producing compounds. In U.S. Pat. No. 4,206,246 to Mamahit, peanuts are immersed in a boiling brine which may contain various flavorings to produce a flavored nut-meat.

The prior art also recognizes that when nuts are defatted, the loss of oil diminishes their flavor. For example, U.S. Pat. No. 3,740,236 to Baxley, indicates that roasted peanut flavor appears to be reduced in proportion to the percentage of the peanut oil removed during the pressing process. Although the exact reason for the flavor loss in partially-defatted nuts is not fully understood, the doctoral dissertation of M. E. Mason, entitled "Procedures in Studying and Factors Influencing the Quality and Flavor of Roasted Peanuts", Oklahoma State University, 1963, pages 63 and 64, indicates that oil pressed from peanuts contains aleurone grains, among other particulates, which appear to contain flavor precursors. The Mason dissertation, however, was not concerned with preparing low-fat nuts, but simply with gaining a better knowledge of the source and identification of flavor principals in peanuts.

In U.S. Pat. No. 4,049,833 to Gannis et al., partially-defatted nuts are reconstituted in a glycerol solution at elevated temperatures. The glycerol solution may have various flavorings and colorants incorporated in it. U.S. Pat. No. 3,645,752 to Baxley discloses a process which comprises mechanically pressing nuts to partially defat them, oil-roasting the nuts, and quenching the hot nuts in a bath of a high stability oil which may contain various flavors. Likewise, U.S. Pat. Nos. 4,364,967 and 4,504,513 to Black, disclose a process comprising mechanically pressing peanuts, simultaneously reconstituting and roasting the peanuts in an oil bath, and quenching the hot peanuts in a second oil bath of a high stability oil which may contain flavor impregnants. The resulting peanuts are then milled into a paste for use as a chocolate extender. The problem, however, with all these processes is that oil roasting and quenching of hot partially-defatted nuts in an oil bath adversely increases the oil content and caloric content of the partially-defatted nuts. As a result, the full, low calorie benefit of partially-defatted nuts cannot be realized.

SUMMARY OF THE INVENTION

The present invention relates to a process of preparing flavorful, partially-defatted nuts by infusing them with a cool edible oil, preferably containing a flavoring agent and a sweetener.

In its most comprehensive form, the process of the present invention first involves pressing raw nuts so that they are partially defatted. The partially-defatted nuts are then roasted preferably in the absence of oil (i.e., dry roasting) and, then, while still hot, contacted with an edible oil under conditions which improve the flavor of the nuts by infusion while maintaining a low fat content. The nuts are then cooled. Optionally, after infusion, the nuts can be coated with powdered flavoring agents, texturizers, binders, sweeteners, or mixtures thereof.

DETAILED DESCRIPTION OF THE INVENTION

The process of the present invention relates to the infusion of partially-defatted nuts with an edible oil, preferably containing a flavoring agent and a sweetener.

The term "nut" as used in this description includes whole nuts and pieces of nuts such as peanuts, almonds, Brazil nuts, filberts, pecans, walnuts, and the like. For purposes of conciseness this description will center around the production of partially-defatted nuts, especially peanuts, having improved flavor. It is not intended, however, to be limited to peanuts or nuts generally because the principles will also apply to other products possessing semi-rigid and non-porous textures, such as garbanzo beans, peas, etc.

In practicing this invention, partially-defatted nuts are prepared by removing some or all of the oil contained in the nuts. For example, oil can be removed from the nuts by mechanically pressing them under conditions effective to at least partially remove the oil from the nuts. Preferred processes for defatting nuts are taught in U.S. Pat. No. 4,329,375 to Holloway, Jr. et al. and U.S. Pat. No. 4,466,987 to Wilkins et al., the disclosures of which are incorporated herein by reference. Generally, such processes remove 40% to about 52% of the oil in nuts which may be blanched or unblanched and raw or roasted, with equivalent results.

Oil is removed from the nuts by the method disclosed in our simultaneously-filed and commonly assigned U.S. patent application Ser. No. 07/401,103, entitled "Partially-Defatted Nuts Having Improved Flavor" which, now U.S. Pat. No. 4,938,987 is incorporated by reference. The process disclosed in this application comprises mechanically pressing raw nuts to extract about 40% to about 52% of their initial oil content. This can be achieved, for example, by employing a Carver Press at applied pressures of greater than about 1,000 psi for about 15 to about 120 minutes. Although the exact times and pressures for oil extraction can be varied to obtain the desired degree and rate of extraction, pressures of no greater than about 1,500 pounds/square inch (psig), particularly about 1,100 to about 1,300 psig, are preferred. Although pressures above this range will extract oil more rapidly, more physical damage to the nuts and possibly a reduction in the amount of retained natural flavors can occur. Although pressures below the disclosed range can be employed with somewhat less nut breakage, the time required for extraction of the desired amount of oil will increase. By utilizing the above-described pressing conditions, a desirable balance between calorie reduction and final product flavor and texture can be achieved with oil reduction of between about 40% and about 52%. Preferably, pressure is elevated to the desired level as quickly as possible.

After pressing, the nuts are flat and undesirably dense. It is, therefore, necessary to expand the nuts to bulk densities (determined by filling a 500 cubic centimeter graduated cylinder with nuts, determining the weight of the nut, and dividing the weight in grams by the volume in cubic centimeters) of less than about 0.40 grams per cubic centimeter (g/cc), preferably within the range of about 0.32 to 0.39 grams per cubic centimeter. This is achieved by contacting the defatted nuts with sufficient water to reconstitute them when subsequently roasted. Such contact is at a level of 3 to 7, preferably 4, pounds of water per hundred pounds of nuts. The water and nuts may be contacted in any suitable mixing device such as a rotatable coating drum.

The partially-defatted nuts are next dry-roasted in any suitable manner that gives them the characteristic taste and texture of roasted nuts. Typically, the nuts are roasted to a moisture content of less than about 3%, preferably less than about 2%, and most preferably about 1.5% or less. The degree to which the nuts are roasted should correspond to an Agtron color photometer reading of about 60 to about 95 in the green mode with 12% and 33% plates defining the reading scale. Most preferably, the reading will be within the range of about 80 to about 90.

Roasting can be achieved by dry roasting (i.e., roasting with hot air substantially in the absence of oil) or by granular roasting methods. Oil roasting, though less desirable, can alternatively be employed.

In air roasting, the nuts are roasted in a stream of hot air at a temperature of about 275° F. to about 400° F., preferably about 320° F. to about 335° F. Roasting times and temperatures can be varied depending upon the particular type of nut being processed, as well as the roasting temperature and degree of roasting desired. Illustratively, the time and extent of roasting will be greater for peanuts (i.e., about 10 minutes to about 30 minutes) than for cashews (i.e., about 3 minutes to about 15 minutes).

In granular roasting, the nuts are contacted with a finely divided heat transfer media which is heated to a temperature of about 315° F. to about 465° F., preferably about 380° F. to about 410° F. Roasting times and temperatures will vary depending upon the particular type of nut being processed and the degree of roasting desired. Illustratively, the time and extent of roasting will be greater in the case of peanuts (i.e., about 1 minute to about 9 minutes) than in the case of cashews (i.e., about 30 seconds to about 3 minutes). The finely divided heat transfer vehicle useful in the practice of this invention can be any suitable finely divided material which will absorb heat from a heat source, such as a flame, and transfer the heat to the nuts upon contact. Preferably, the finely divided heat transfer vehicle can be salt, ceramic beads, sand, or metal balls, preferably ceramic beads.

After the roasting, the nuts are contacted with an edible oil. The edible oil can be any conventional vegetable oil utilized in foods, including coconut, nut, sesame, cottonseed, corn, or palm oil, which may be partially or wholly hydrogenated. Preferably, a nut oil derived from the same type of nut as the partially-defatted nut of this invention is utilized. For instance, if the partially-defatted nut is a peanut, the oil is peanut oil. However, it is not necessary to use oil from the same sub-type of nut as the partially-defatted nut. For example, if the partially-defatted nut is a Jumbo Runner peanut, it is not necessary to use the oil from Jumbo Runner peanuts. In fact, superior results are achieved when partially-defatted Jumbo Runner peanuts are infused with oil extracted from Spanish peanuts.

Preferably, the edible oil contains a flavoring agent which is incorporated into the nuts. Suitable flavoring agents include nut flavor concentrates which are naturally present in nuts or nut oil. Such materials can be obtained by a variety of conventional techniques (e.g., dark roasting nuts and then extracting the nut oil). These nut flavor concentrates can be recovered from nuts which are either the same as or different from the partially-defatted nut being infused. Other flavoring agents include: fruit flavors; chocolate or other confectionary flavors; mint flavor; honey flavor; the flavor of alcoholic beverages such as beer, wine and whiskey; any other desired artificial or natural flavor, and mixtures thereof.

Heat sensitive additives, such as artificial sweeteners (e.g., aspartame) and certain fat-soluble vitamins A, D, and E may also be included in the edible oil used for infusion. When heat sensitive materials are added, infusion should not be initiated until the nuts are cooled to a temperature of no greater than about 160° F. Additionally, other desired additives such as texturizers may be included in the edible oil infusion.

The oil contacting step is distinguishable from prior art oil quenching operations by virtue of the weight ratio of oil in contact with the nuts. When quenching, after oil roasting, the nuts are immersed in a bath, causing the nuts to return to a full fat level (i.e., about 55 weight %). By contrast, in the oil contacting step of the present invention, a large amount by weight of dry roasted nuts is contacted with a relatively small quantity of oil. As a result, only that limited quantity of oil is capable of being infused into the nuts, giving them a low calorie content. The quantity of oil utilized is 5-15, preferably 10, pounds of oil per 100 pounds of nuts which will return the fat content of the nuts to 33-40% weight. It is particularly desirable to contact the nuts with oil while the nuts are still hot (i.e., at least 160° F.) and the oil is relatively cool (i.e., 40°-100° F., F) preferably 65°-70° F.).

The edible oil and any other additives are mixed in a suitable vessel by conventional means. Infusion can then be effected by any conventional technique. For example, spraying a controlled amount of flavored oil onto moving nuts in a continuous coating drum is for a period of time sufficient to allow infusion of edible oil and any additives to a level of about 2% to about 10% by weight of the nuts. Typically, infusion is carried out for about one minute to about five minutes.

Infusion in accordance with the present invention produces partially-defatted nuts with improved flavor and a low oil content. Further, the process of the present invention permits inclusion of desired heat-sensitive additives in partially-defatted nuts.

After infusion, the nuts can be coated with various powdered flavoring agents such as, allspice, cinnamon, clove, caraway, bay, sage, ginger, basil, and the like. These materials can be employed alone or with condiments such as salt, pepper, monosodium glutamate, and the like. In addition, texturizers such as, glycerine and polypropylene glycol and binders such as, natural gums, dextrins, gelatin, sugars, and the like.

The following examples are presented to further illustrate and explain the present invention and should not be viewed as limiting in any regard. Unless otherwise indicated, all parts and percentages are by weight, and are based on the total weight of the product at that particular stage in processing.

EXAMPLE I

Raw redskin jumbo runner peanuts at 50% fat and 7% moisture content are placed in a Carver Press and pressed starting at 500 psig. The pressure is gradually increased to 1,200 psig until 52% of the oil is removed, usually in around 35-40 minutes. The pressed peanuts are then blanched by a rotary blancher to remove most of the redskins. Next, the pressed, blanched peanuts are contacted with water at a level of 4 pounds per 100 pounds of nuts to obtain maximum expansion during roasting.

The pressed peanuts are placed in a forced draft oven and dry roasted at 330° F. for approximately 13 minutes. The roasted, expanded peanuts have a moisture content of 2% and an Agtron color photometer reading of approximately 60 using the green mode with the 12% and 33% plates defining the reading scale. While the dry roasted peanuts are at 160° F., they are contacted with peanut oil (containing a red dye to test for degree of infusion) at room temperature and at a level of 10 pounds of oil per 100 pounds of nuts. The oil is absorbed in two minutes.

Cross-sectional cuts were made on numerous nuts and were found to have red dye throughout them with an average of about 50% of the nuts being infused. The oil content of the product was found to be 38%, while the caloric level compared to full fat nuts was reduced by 42%.

EXAMPLE II

Peanuts which have been pressed and roasted according to Example I were divided into two equal batches.

One batch is infused with oil as in Example I to achieve an oil content of 38%.

The other batch is divided into five equal amounts and each one is quenched (i.e., immersed) in an oil bath at temperatures of 70° F. and 150° F. for a variety of times ranging from 15 seconds to five minutes. All of the samples absorbed excessive amounts of oil, ranging from 24 to 37% and an analysis of all finished product indicated that they had oil levels very close to that of regular full fat peanuts (i.e, 47–52%). These results for quenching treatment are set forth below in Table 1.

TABLE 1

| Sample No. | Quench Time | Quench Temperature | Oil Content |
|---|---|---|---|
| 1 | 30 seconds | 70° F | 47.72% |
| 2 | 5 minutes | 71° F | 52.26% |
| 3 | 15 seconds | 72° F | 47.13% |
| 4 | 1 minute | 73° F | 49.8% |
| 5 | 15 seconds | 150° F | 47.7% |

In addition, peanuts pressed in accordance with Example 1 were oil roasted and then oil quenched at a variety of times and temperatures by immersion in oil bath. The resulting peanuts had even greater levels of oil than those produced by dry roasting and then oil quenching. Table 2 summarizes these results.

TABLE 2

| Sample No. | Quench Time | Quench Temperature | Oil Content |
|---|---|---|---|
| 6 | 30 seconds | 70° F | 54.03% |
| 7 | 5 minutes | 71° F | 59.25% |
| 8 | 15 seconds | 73° F | 53.82% |
| 9 | 1 minute | 73° F | 57.88% |
| 10 | 15 seconds | 150° F | 54.96% |

EXAMPLE III

Raw redskin jumbo runner peanuts which have been pressed, blanched, and roasted according to Example I are divided into three 200 gm. batches and, while at 160° F., are contacted with mixtures of fruit flavors and peanut oil at room temperature as set forth below in Table 3.

TABLE 3

| Ingredient | Quantity (grams) | | |
|---|---|---|---|
| | Raspberry Flavored Nuts | Grape Flavored Nuts | Banana Flavored Nuts |
| Peanuts | 200 | 200 | 200 |
| Peanut Oil | 20 | 20 | 20 |
| Raspberry Flavor | 0.3 | — | — |
| Grape Flavor | — | 0.5 | — |
| Banana Flavor | — | — | 0.6 |
| Citric Acid | 0.6 | 0.9 | 0.3 |
| Aspartame | 0.5 | 0.5 | 0.5 |

Each of the sweet, fruit-flavored, low-calorie samples had a bulk density of 0.4 gms/cc as compared to 0.6 gms/cc for full fat dry roasted nuts with a 38% oil content and a reduction in calories of 42%.

An expert sensory panel rated each of the fruit-flavored samples as highly acceptable.

The above description is presented for the purpose of teaching the person of ordinary skill in the art how to make and use the invention. It is not intended to detail all those obvious modifications and variations of the invention which will become apparent to the skilled worker upon reading the description. It is intended, however, that all such obvious modifications and variations be included within the scope of the invention which is defined in the following claims.

What is claimed is:

1. A process of producing flavorful low fat nuts comprising:
   pressing raw nuts so that they are partially defatted;
   roasting the partially defatted nuts in the absence of oil; and
   contacting the roasted, partially defatted nuts while at a temperature of at least about 160° F. with an edible oil at a temperature of about 40° F. to about 100° F. at a level of 5 to 15 pounds of oil per 100 pounds of nuts, whereby the edible oil is infused into the roasted, partially defatted nuts to produce low fat nuts with an oil content of 33% to 45% and an improved flavor.

2. A process according to claim 1, wherein the nuts are selected from the group consisting of peanuts, almonds, Brazil nuts, filberts, pecans, walnuts, and mixtures thereof.

3. A process according to claim 2, wherein the nuts are peanuts.

4. A process according to claim 4, wherein the edible oil is peanut oil.

5. A process according to claim 1, wherein the edible oil contains a flavoring agent.

6. A process according to claim 5, wherein the flavoring agent is a nut flavor concentrate.

7. A process according to claim 1, wherein the edible oil contains a sweetener.

8. A process according to claim 7, wherein the sweetener is aspartame.

9. A process according to claim 1 further comprising:
   coating the low fat nuts with powdered flavoring agents, texturizers, binders, sweeteners, or mixtures thereof.

10. A process according to claim 1, wherein said pressing is mechanically effected to reduce the oil content of the raw nuts by 40–52%.

11. A process according to claim 1, wherein said roasting is with hot air at a temperature of 275° to 400° F., and said process further comprises:

contacting the nuts with water at a level of 3 to 7 pounds of water per hundred pounds of nuts prior to said roasting.

12. A process according to claim 11, wherein the roasted, partially defatted nuts have a moisture content of less than 3% and are roasted to a color level of 60 to 95 measured on an Agtron color photometer employed in the green mode with 12% and 33% plates defining the reading scale.

13. A process of producing flavorful low fat nuts comprising:

roasting partially defatted nuts in the absence of oil and contacting the roasted, partially defatted nuts while at a temperature of at least about 160° F. with an edible oil at a temperature of about 40° F. to about 100° F. at a level of 5 to 15 pounds of oil per 100 pounds of nuts, whereby the edible oil is infused into the roasted, partially defatted nuts to produce low fat nuts with an oil content of 33% to 45% and an improved flavor.

14. A process according to claim 13, wherein the edible oil contains a flavoring agent.

15. A process according to claim 13, wherein the edible oil contains a sweetener.

16. A process according to claim 13 further comprising:

coating the low fat nuts with powdered flavoring agents, texturizers, binders, sweeteners, or mixtures thereof.

17. A process according to claim 13, wherein said roasting is with hot air at a temperature of 275° to 400° F., and said process further comprises:

contacting the nuts with water at a level of 3 to 7 pounds of water per hundred pounds of nuts prior to said roasting.

18. The low fat nuts produced according to the process of claim 3 in which the nuts have an oil content of 30–45%.

19. The low fat nuts produced according to the process of claim 6 in which the nuts have an oil content of 30–45%.

20. The low fat nuts produced according to the process of claim 7 in which the nuts have an oil content of 30–45%.

* * * * *

UNITED STATES PATENT AND TRADEMARK OFFICE
CERTIFICATE OF CORRECTION

PATENT NO. : 5,002,802

DATED : March 26, 1991

INVENTOR(S) : Peter Ganis and Howard Wilkins

It is certified that error appears in the above-identified patent and that said Letters Patent is hereby corrected as shown below:

Col. 6, line 51, "claim 4" should read --claim 3--.

Signed and Sealed this

Eleventh Day of August, 1992

Attest:

DOUGLAS B. COMER

*Attesting Officer*      Acting Commissioner of Patents and Trademarks